March 15, 1932.  C. W. CUTLER  1,849,825
SYSTEM OF MOTOR CONTROL
Filed April 30, 1929
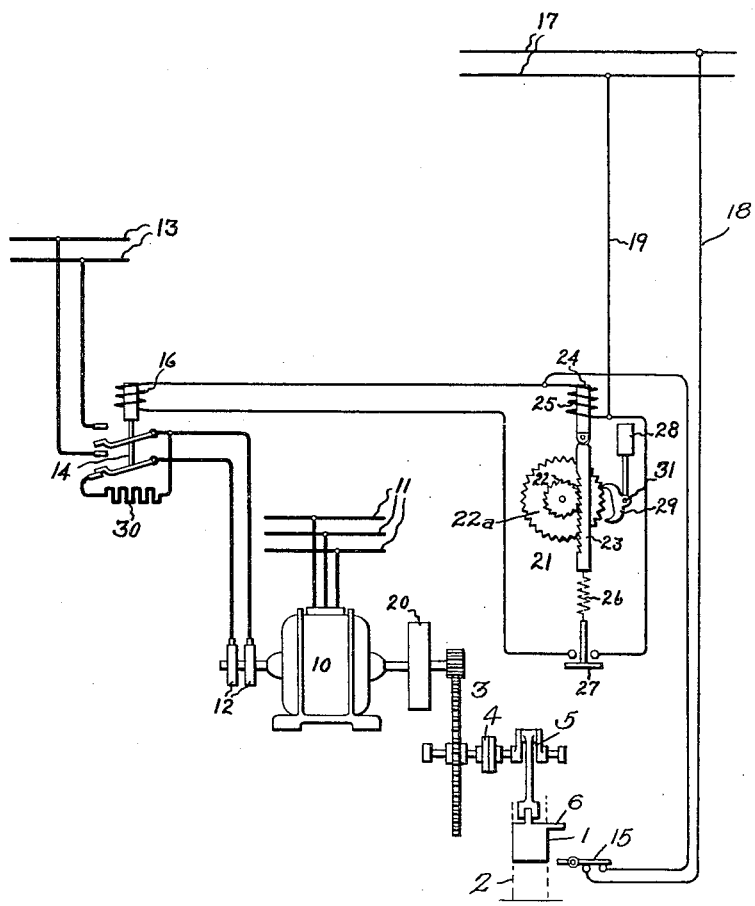
Inventor:
Clarence W. Cutler,
by Charles E. Tullar
His Attorney.

Patented Mar. 15, 1932

1,849,825

UNITED STATES PATENT OFFICE

CLARENCE W. CUTLER, OF WHEATON, ILLINOIS, ASSIGNOR TO GENERAL ELECTRIC COMPANY, A CORPORATION OF NEW YORK

SYSTEM OF MOTOR CONTROL

Application filed April 30, 1929. Serial No. 359,351.

This invention relates to motor control systems and more particularly to systems in which an alternating current motor is employed to drive a machine to which the load is intermittently or recurrently applied such, for example, as a punch press.

In the past it has been customary to employ squirrel cage motors provided with flywheels for driving loads of the above mentioned type. It is desirable, however, for economic reasons to employ synchronous motors in such applications because of the ability of a synchronous motor to take current from the line at unity or even at leading power factor.

In the past, a disadvantage of driving an intermittently applied load by a synchronous motor has been the employment of synchronous motors of a capacity sufficient to sustain the peak load without dropping out of step, thus rendering the use of a flywheel valueless. Obviously, a synchronous motor designed to handle peak loads without dropping out of step must of necessity be of much larger capacity than is actually required by the average load over the duty cycle; for example, in the case of a duty cycle in which the motor is running light nearly 90% of the time, as in the case of a motor driving a punch press, an excessively large and unnecessarily expensive motor would be required.

Accordingly an object of my invention is to provide a control system for a synchronous motor provided with a flywheel and connected to drive an intermittently applied load, in which the motor will be caused to operate asynchronously when the load is applied, thereby allowing the flywheel to give up its stored energy during the application of the load and to store up energy after the load is removed but before the motor is restored to synchronism.

In illustrating my invention in one form I have shown it as embodied in a control system for a synchronous motor arranged to drive a punch press or a machine having similar load characteristics.

In carrying my invention into effect in one form thereof I provide a switch for opening and closing the direct current field circuit of the motor in accordance with the position of the punching die with respect to the work.

For a better and more complete understanding of my invention reference should now be made to the following specification and to the accompanying drawing, the single figure of which is a simple, diagrammatical representation of an embodiment of my invention.

Referring now to the drawing, the work performing member of a machine such for example as the die 1 of a punch press is actuated into and out of engagement with the work located in the hatchway 2, by the synchronous motor 10 to the drive shaft of which the die 1 is connected through the reduction gearing 3, a clutch device 4 and a crank mechanism 5 as shown. The synchronous motor 10 is arranged to be supplied from a suitable source of three phase power represented in the drawing by the three supply lines 11. The terminals of the direct current field winding of the motor are brought out to slip rings 12 and are arranged to be connected with a suitable source of direct current supply, such as the supply lines 13, through the contacts of field contactor 14. Although not illustrated in the drawing it will be understood by persons skilled in the art that a suitable starting device is provided for connecting the terminals of the motor with the supply lines and that the rotor member of the motor is provided with a suitable squirrel cage winding to enable the motor to be brought to synchronous speed before the direct current field winding is energized.

A limit switch 15 is provided in the hatchway of the punch press and is arranged to have its contacts opened by the die when the latter is at a predetermined point in the hatchway, or at a predetermined distance from the work. The limit switch 15 serves, when operated to the open position by the die, to disconnect the energizing coil 16 of field contactor 14 from the source of supply 17 from which it is supplied with current over conductors 18 and 19. Limit switch 15 is of such construction and is so placed in the hatchway that the return stroke of the die will operate limit switch 15 to the closed position for partially re-establishing the energizing circuit for the coil 16. The die 1 is provided with a finger 6 which engages the movable member of the limit switch 15 at some point in the travel of the die; the position of the switch in the hatchway being preferably so chosen that it is engaged by the finger 6 in response to limited operation of the motor 10 approximately at the instant that the die 1 engages the work or slightly before that time so that the direct current field winding of the motor 10 will be deenergized as the load comes on.

A flywheel 20 is provided upon the shaft of synchronous motor 10 and as will be understood by those skilled in the art gives up its stored energy to the load when the speed of the motor falls below synchronism.

In order to permit the synchronous motor 10 to store energy in the flywheel 20 after the die has left the work and is on the return stroke, a time delay device 21 is provided for preventing limit switch 15 from completing the energizing circuit for the coil 16. As shown in the drawing, time delay device 21 comprises a gear train 22, 22a in engagement with the one way ratchet teeth of a weighted rod 23 which is suspended from the core member 24. An energizing coil 25 for the core member 24 is arranged to be supplied from the direct current source of supply 17 through conductors 18 and 19 when the limit switch 15 is in the closed position. As shown in the drawing, the ratchet teeth of the weighted bar 23 slide inoperatively over the teeth of the small gear 22 with which it is in engagement and thus when coil 25 is deenergized, the weighted rod 23 is permitted to descend rapidly under the attraction of gravity to release the tension of spring 26 and to permit contactor 27 to interrupt the energizing circuit of the field contactor 14. A pendulum escapement device comprising a pendulum 28 and an escapement pawl 29 serves to retard the return of weighted arm 23 when coil 25 is again energized.

It will be realized that the opening of the direct current field circuit by the contactor 14 during each operating cycle would cause severe arcing or burning at the contact tips if suitable precautions were not taken, and to this end I provide a discharge resistor 30 and connect it as shown in the drawing, so that the opening of the lower movable contact member of the field contactor 14 connects the discharge resistor across the terminals of the direct current field winding when the contactor is operated to the open position.

With the above understanding of the elements illustrated in the drawing and the manner in which they are connected to or associated with each other, the operation, which will now be described in detail, will be readily understood.

It will be assumed that the synchronous motor 10 has been started up by suitable starting devices well known to all skilled workers in the art. As the die of the punch press approaches to within a short distance of the work, for example one-half inch, it will open the limit switch 15 thereby disconnecting the energizing coil 16 of field contactor 14 from the source of supply 17. Contactor 14 will then fall to the open position disconnecting the direct current field winding of synchronous motor 10 from the source of supply 13 and, as before explained, connecting the discharge resistor 30 across the terminals of the field winding. The synchronous motor 10 will no longer operate as a synchronous motor when the direct current field is interrupted. On the contrary, it will operate asynchronously, that is to say, that after the die of the punch press is driven into engagement with the work, the motor 10 will tend to slow down. This slowing down permits the flywheel 20 to give up its stored energy to the load so that the peak load caused by the die coming into engagement with the work requires very little energy to be taken from the supply lines 11 by the motor 10 during this period.

The opening of the limit switch 15 also results in deenergizing the coil 25 and permits the bar 23 to descend rapidly under the attraction of gravity thereby releasing the tension of spring 26 and allowing contactor 27 to become disengaged from its stationary contact members further to interrupt the energizing circuit for coil 16. On the return stroke of the die, the limit switch 15 is again closed which results in reestablishing the energizing circuit for the coil 25 and partially reestablishing the energizing circuit of coil 16 which is still open at the contactor 27.

The core 24 of time delay device 21 in responding to the energization of coil 25 tends to move upwardly but is retarded by the gear train 22, 22a and the pendulum escapement device 28, 29. However, the force applied to the bar 23 is transmitted through the gear train to the escapement pawl 29 which moves about its pivot 31. Pendulum 28 is rigidly attached to escapement pawl 29 and after the upper claw of the latter is disengaged from the teeth of the large gear 22a, the bar 23 is permitted to advance the gear train 22 one tooth while the pendulum 28 is swung through its arc before the lower claw of escapement pawl 29 engages the teeth of the gear train to again stop its motion. Those skilled in the art will understand that the pendulum 28 may be timed as desired, and in the illustration shown, it is to be understood that the pendulum 28 is so timed as to cause the escapement 29 to permit the gear train to be advanced one tooth at a time by the force applied to the bar 23. The escapement action just described continues as long as coil 25 is energized until the contactor 27 has been actuated to the closed position in which it bridges its stationary contacts and closes the energizing circuit for the coil 16. Thus it will be seen that the timed escapement above described provides a definite time delay device and thus prevents the contactor 16 from closing to reestablish the field circuit for the synchronous motor 10 until a definite time has elapsed after the die of the punch press has operated the limit switch 15 to the closed position. The time delay device 21 is so designed that it will prevent the closing of the direct current field circuit of the motor for a time interval sufficient to enable the squirrel cage winding on the rotor member to restore the motor to synchronous speed and to store the required amount of energy in the flywheel.

It is not necessary to the operation of this invention that the limit switch 15 be used. For instance, instead of the limit switch 15 operated by the die of the punch press, I might arrange the contactor 14 to be opened when the clutch which connects the motor 10 to the punch press is actuated to the operative position, or I might provide a drum switch driven in accordance with the travel of the die for deenergizing and reenergizing contactor 14 again at the proper time.

Thus it will be seen that I have provided a control system which will permit the use of a synchronous motor for driving a machine to which a load is intermittently and recurrently applied and which will permit of the use of a synchronous motor much smaller in size than would ordinarily be required to sustain peak loads.

While I have described my invention as comprising particular elements associated with, or connected to each other in a particular manner, I would have it understood that this invention is not limited to the particular elements and connections disclosed in the drawing for the purposes of illustration, since alterations and modifications will readily occur to those skilled in the art without departing from the true spirit of the invention or from the scope of the annexed claims.

What I claim as new and desire to secure by Letters Patent of the United States, is,—

1. A motor control system comprising a movable work performing member, a synchronous motor provided with an energy storage device and arranged for moving said member into and out of engagement with the work, means controlled in accordance with the work engaging movement of said member for deenergizing the direct current field winding of said motor, and controlled in accordance with the return movement of said member for reenergizing said field circuit whereby said synchronous motor is caused to run asynchronously and said energy storage device is enabled to impart a portion of its stored energy during the work engaging movement of said member.

2. In a system of motor control for machine tools and the like, a tool, a synchronous motor arranged to operate said tool into and out of engagement with the work during continuous operation of said motor, a switch arranged to be operated by said tool during the work engaging stroke thereof to deenergize the direct current field of said motor and to be operated during the return stroke of said tool to reestablish said field, whereby said synchronous motor is caused to operate asynchronously during the engagement of said tool with said work.

3. A motor control system comprising a synchronous motor provided with a flywheel and arranged to drive an intermittent load, means for deenergizing the field of said motor prior to the application of said load, and for reenergizing said field after the cessation of said load, and time delay means under the control of said first named means for preventing the reenergization of said field for a predetermined time interval after the cessation of said load.

4. In a motor control system, a synchronous motor provided with a flywheel and arranged to drive an intermittently applied load, a movable member, means for moving said member in accordance with the application and removal of the load, a contactor in the field circuit of said motor and a switch responsive to the movement of said member corresponding to the application of said load for operating said contactor to deenergize said field and responsive to movement of said member corresponding to the removal of said load for partially reestablishing the energizing circuit of said contactor, and time delay means responsive to the operation of said switch for completing the energizing circuit of said contactor a predetermined time interval after the cessation of said load, whereby said flywheel is permitted to give up its stored energy during the application of said load, and to absorb energy after the cessation of said load.

5. In a control system for motor driven tools and the like, a tool, a synchronous motor provided with a flywheel and connected for operating said tool for repeated engagement and disengagement with a piece of work, a contactor connected in the field circuit of said motor, a switch arranged to be operated by said tool during the work engaging stroke for operating said contactor to deenergize said field, and to be operated during the work disengaging stroke of said tool for partially reestablishing the energizing circuit for said contactor, thereby causing said synchronous motor to operate asynchronously and said flywheel to give up its stored energy when said tool is in engagement with the work, and a time delay device for completing the energizing circuit for said contactor a definite time interval after said tool is disengaged from said work whereby said motor is caused to attain its synchronous speed before said field is reenergized.

6. In combination a movable member, a synchronous motor for operating said member, and means responsive to the position of said member for interrupting and reestablishing the direct current field circuit of said motor.

7. In combination, a movable member, a synchronous motor for moving said member, and means responsive to movement of said member for interrupting and reestablishing the direct current field circuit of said motor.

8. In combination, a synchronous motor, and means including a limit switch operated by said motor for interrupting the direct current field circuit of said motor after limited operation thereof and for reestablishing said circuit after additional operation of said motor.

9. A motor control system for machine tools and the like having a work performing member, a synchronous motor provided with a flywheel and connected to drive said member so as to actuate it into and out of engagement with the work, a control switch arranged to be operated by said member before engagement with the work to deenergize the field circuit of said motor and to be operated by said member after engagement with the work to reenergize said field circuit, whereby said synchronous motor is caused to operate asynchronously and said flywheel is caused to give up a portion of its energy when said work-performing member is in contact with the work.

In witness whereof, I have hereunto set my hand this 26th day of April, 1929.

CLARENCE W. CUTLER.